Patented Dec. 23, 1941

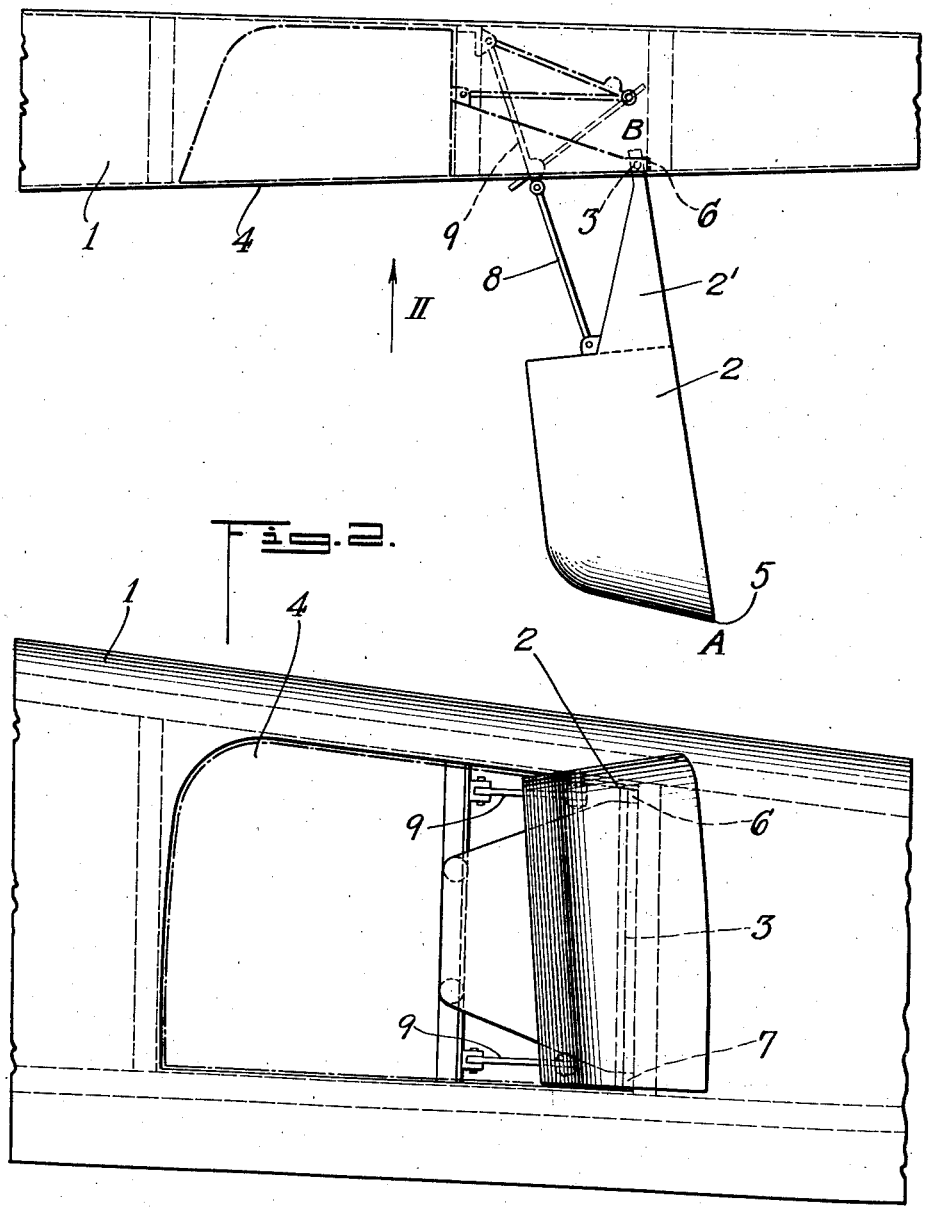

2,267,615

UNITED STATES PATENT OFFICE 2,267,615

AIRCRAFT FLOAT

Herbert Mende, Friedrichshafen-Manzell, Germany, assignor to Dornier-Werke G. m. b. H., Friedrichshafen-on-the-Bodensee, Germany Application February 25, 1939, Serial No. 258,356
In Germany March 5, 1938

3 Claims. (Cl. 244—102)

The present invention relates to floats for aircraft which can be swung into the aircraft body or wing whereby part of the surface of the float forms part of the surface of said body or wing and an uninterrupted body or wing surface is formed and no additional means are needed for fully closing the openings provided in the body or wing for receiving the float.

In the drawing an embodiment of the present invention is shown by way of example.

Figure 1 is a diagrammatic front view of part of an aircraft which is equipped with floats according to the present invention.

Figure 2 is a diagrammatic bottom view of the part of the aircraft shown in Figure 1 and looking in the direction of arrow II of Fig. 1.

Like parts are designated by like numerals in both figures of the drawing.

Referring more particularly to the drawing, I is the wing of an airplane which is equipped with a float 2 which can be swung about an axis 3 into a recess 4 in the wing I which closely conforms with the float 2. The axis 3 is situated directly adjacent to the lower skin surface of the wing so that no openings are left in the lower wing surface when the float is in retracted position. Furthermore, the upper part 2' of the float has a forked configuration and the hinges 6 and 7 are situated at the ends of the prongs of the fork and are consequently very short so that the size of the opening adjacent to the hinges is further reduced. In swung out or protracted position the float is propped against the wing by means of a toggle lever 8, 9.

Since the configuration of the recess 4 conforms exactly with the float the lower wing surface is without any interruption when the float is in retracted position and no addition means, such as flaps and the like, are required for completely closing the opening in the wing. The keel 5 of the float according to the present invention is positioned on that side of the float which is lowermost when the float is retracted. This is essential for assuring a complete closing of the opening in the lower part of the wing. The surface A—B of the float which is outside when the float is retracted conforms exactly with the desired wing surface.

In both figures of the drawing the float is shown in protracted or swung out position. Retracted position of the float is indicated by dash-and-dotted lines.

While I believe the above described embodiments of my invention to be preferred embodiments, I wish it to be understood that I do not desire to be limited to the exact details of design and construction shown and described, for obvious modifications will occur to a person skilled in the art.

I claim:

1. In combination with an aircraft, a wing having a cavity extending from the undersurface of said wing into said wing, hinge means disposed at the undersurface of said wing adjacent to said cavity, a float swingably connected with said hinge means, said float having a substantially flat wall portion extending from said hinge means and being flush with and forming an uninterrupted surface with the undersurface of said wing and completely closing said cavity when said float is swung into said cavity and extending downward from said wing when said float is swung out of said cavity, a float body connected to said wall portion and forming therewith an edge portion constituting a keel when said float is in swung out position and abutting the rim of said cavity when said float is in said cavity.

2. In combination with an aircraft, a wing having a cavity extending from the undersurface of said wing into said wing, a float comprising a float element having a substantially plane wall extending downward from said wing when said float is in swung out position, substantially hollow stay members swingably connected with said wing at the undersurface thereof and connected with said element and having a substantially plane wall portion forming the continuation of said substantially plane wall of said float element, the outer surface of said wall and of said wall portions being flush with and forming an uninterrupted surface with the undersurface of said wing and completely closing said cavity when said float is swung into said cavity.

3. In combination with an aircraft, a wing having a cavity extending from the undersurface of said wing into said wings, hinge means disposed at the undersurface of said wing adjacent to said cavity, a float body having a substantially flat wall portion extending downward from said wing when said float is in operating position, substantially hollow stay members swingably attached to said hinge means and connected with said float body and having a substantially plane wall portion extending from and forming the continuation of said flat wall portion of said float body, said float body extending laterally from its flat wall portion when the float is in operating position and having another wall portion enclosing with said flat wall portion an angle smaller than 90° and forming a keel with the lower edge of said flat wall portion, said keel abutting the rim of said cavity and said flat wall portion of said float body and said plane wall portion of said stay members completely closing said cavity and uninterruptedly forming part of the undersurface of said wing when said float is swung into said cavity.

HERBERT MENDE.